(12) United States Patent
Siripunkaw et al.

(10) Patent No.: US 12,047,230 B2
(45) Date of Patent: *Jul. 23, 2024

(54) INITIALIZING, PROVISIONING, AND MANAGING DEVICES

(71) Applicant: Comcast Cable Communications, LLC, Philadelphia, PA (US)

(72) Inventors: Pak Siripunkaw, Sicklerville, NJ (US); John Jason Brzozowski, Schwenksville, PA (US); Srinivas Avirneni, Chester Springs, PA (US); Emery J. Weber, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 442 days.

This patent is subject to a terminal disclaimer.

(21) Appl. No.: 17/518,630

(22) Filed: Nov. 4, 2021

(65) Prior Publication Data

US 2022/0060376 A1    Feb. 24, 2022

Related U.S. Application Data

(63) Continuation of application No. 16/197,758, filed on Nov. 21, 2018, now Pat. No. 11,196,622, which is a
(Continued)

(51) Int. Cl.
*H04L 41/0806* (2022.01)
*H04L 12/28* (2006.01)
(Continued)

(52) U.S. Cl.
CPC ...... *H04L 41/0806* (2013.01); *H04L 12/2801* (2013.01); *H04L 41/046* (2013.01);
(Continued)

(58) Field of Classification Search
None
See application file for complete search history.

(56) References Cited

U.S. PATENT DOCUMENTS 5,440,632 A    8/1995   Bacon et al.
5,666,293 A    9/1997   Metz et al.
(Continued)

FOREIGN PATENT DOCUMENTS

WO    2005079000 A1    8/2005

OTHER PUBLICATIONS

ISR issued in PCT/US08/081422, mail date Dec. 23, 2008.
(Continued)

*Primary Examiner* — Nguyen H Ngo
(74) *Attorney, Agent, or Firm* — Banner & Witcoff, Ltd.

(57) ABSTRACT

A method of initializing, provisioning, and managing a cable modem and a customer premise equipment device includes sending a customized configuration file to the cable modem. The configuration file contains service provisioning information and further includes information indicative of a network address type for the customer premise equipment device. A message is passed from the cable modem to the customer premise equipment device indicative of the network address type. The customer premise equipment device is provided with a network address in accordance with the network address type indicated in the message. In this way, the customer premise equipment device knows what kind of address to obtain, and excessive transactions are avoided.

20 Claims, 2 Drawing Sheets

Related U.S. Application Data continuation of application No. 13/429,962, filed on Mar. 26, 2012, now Pat. No. 10,171,293, which is a continuation of application No. 11/603,396, filed on Nov. 22, 2006, now Pat. No. 8,149,847.

(60) Provisional application No. 60/791,803, filed on Apr. 13, 2006, provisional application No. 60/739,472, filed on Nov. 23, 2005.

(51) Int. Cl.
*H04L 41/046* (2022.01)
*H04L 41/082* (2022.01)
*H04L 41/084* (2022.01)
*H04L 61/5014* (2022.01)
*H04N 7/173* (2011.01)
*H04N 21/426* (2011.01)
*H04N 21/443* (2011.01)
*H04N 21/61* (2011.01)
*H04L 61/00* (2022.01)

(52) U.S. Cl.
CPC ........ *H04L 41/082* (2013.01); *H04L 41/0843* (2013.01); *H04L 61/5014* (2022.05); *H04N 7/17309* (2013.01); *H04N 21/42676* (2013.01); *H04N 21/42684* (2013.01); *H04N 21/4432* (2013.01); *H04N 21/6118* (2013.01); *H04L 61/00* (2013.01)

(56) References Cited

U.S. PATENT DOCUMENTS

| | | |
|---|---|---|
| 5,845,077 A | 12/1998 | Fawcett |
| 6,023,464 A | 2/2000 | Woundy |
| 6,070,246 A | 5/2000 | Beser |
| 6,308,289 B1 | 10/2001 | Ahrens et al. |
| 6,351,773 B1 | 2/2002 | Fijolek et al. |
| 6,393,585 B1 | 5/2002 | Houha et al. |
| 6,501,750 B1 | 12/2002 | Shaffer et al. |
| 6,529,910 B1 | 3/2003 | Fleskes |
| 6,553,568 B1 | 4/2003 | Fijolek et al. |
| 6,560,203 B1 | 5/2003 | Beser et al. |
| 6,570,855 B1 | 5/2003 | Kung et al. |
| 6,574,796 B1 | 6/2003 | Roeck et al. |
| 6,577,642 B1 | 6/2003 | Fijolek et al. |
| 6,598,057 B1 | 7/2003 | Synnestvedt et al. |
| 6,603,758 B1 | 8/2003 | Schmuelling et al. |
| 6,636,485 B1 | 10/2003 | Fijolek et al. |
| 6,654,387 B1 | 11/2003 | Beser et al. |
| 6,657,991 B1 | 12/2003 | Akgun et al. |
| 6,658,000 B1 | 12/2003 | Raciborski et al. |
| 6,690,655 B1 | 2/2004 | Miner et al. |
| 6,693,878 B1 | 2/2004 | Daruwalla et al. |
| 6,715,075 B1 | 3/2004 | Loukianov |
| 6,751,299 B1 | 6/2004 | Brown et al. |
| 6,768,722 B1 | 7/2004 | Katseff et al. |
| 6,768,743 B1 * | 7/2004 | Borella ............... H04L 61/2564 370/475 |
| 6,822,955 B1 | 11/2004 | Brothers et al. |
| 6,831,921 B2 | 12/2004 | Higgins |
| 6,836,806 B1 | 12/2004 | Raciborski et al. |
| 6,857,009 B1 | 2/2005 | Ferreria et al. |
| 6,865,613 B1 | 3/2005 | Millet et al. |
| 6,904,460 B1 | 6/2005 | Raciborski et al. |
| 6,917,675 B2 | 7/2005 | Lazarus et al. |
| 6,952,428 B1 | 10/2005 | Necka et al. |
| 6,996,621 B1 | 2/2006 | Borella et al. |
| 7,007,080 B2 | 2/2006 | Wilson |
| 7,035,270 B2 | 4/2006 | Moore, Jr. et al. |
| 7,039,432 B2 | 5/2006 | Strater et al. |
| 7,058,055 B2 | 6/2006 | Mugica et al. |
| 7,065,047 B2 | 6/2006 | Boxall et al. |
| 7,085,814 B1 | 8/2006 | Gandhi et al. |
| 7,092,397 B1 | 8/2006 | Chandran et al. |
| 7,107,326 B1 | 9/2006 | Fijolek et al. |
| 7,120,139 B1 | 10/2006 | Kung et al. |
| 7,127,049 B2 | 10/2006 | Godse et al. |
| 7,142,510 B1 * | 11/2006 | Beddus ............... H04Q 11/0478 370/401 |
| 7,158,543 B1 | 1/2007 | Garakani et al. |
| 7,213,062 B1 | 5/2007 | Raciborski et al. |
| 7,272,846 B2 | 9/2007 | Williams et al. |
| 7,285,090 B2 | 10/2007 | Stivoric et al. |
| 7,293,078 B2 | 11/2007 | Danforth |
| 7,293,282 B2 | 11/2007 | Danforth et al. |
| 7,308,700 B1 | 12/2007 | Fung et al. |
| 7,334,258 B1 | 2/2008 | Ford et al. |
| 7,337,217 B2 | 2/2008 | Wang |
| 7,353,021 B2 | 4/2008 | Ejzak et al. |
| 7,356,841 B2 | 4/2008 | Wilson et al. |
| 7,372,809 B2 | 5/2008 | Chen et al. |
| 7,373,660 B1 | 5/2008 | Guichard et al. |
| 7,415,603 B2 | 8/2008 | Woundy et al. |
| 7,443,883 B2 | 10/2008 | Seiden |
| 7,467,214 B2 | 12/2008 | Chin |
| 7,484,234 B1 | 1/2009 | Heaton et al. |
| 7,496,485 B2 | 2/2009 | Elfadel et al. |
| 7,496,652 B2 | 2/2009 | Pezzutti |
| 7,502,841 B2 * | 3/2009 | Small ............... H04L 12/1482 725/111 |
| 7,512,969 B2 | 3/2009 | Gould et al. |
| 7,526,538 B2 | 4/2009 | Wilson |
| 7,539,193 B2 | 5/2009 | Pfeffer et al. |
| 7,568,220 B2 | 7/2009 | Burshan |
| 7,600,003 B1 | 10/2009 | Okmianski et al. |
| 7,609,619 B2 | 10/2009 | Naseh et al. |
| 7,617,517 B2 | 11/2009 | Kay |
| 7,647,617 B2 | 1/2010 | Bartfeld et al. |
| 7,693,171 B2 | 4/2010 | Gould |
| 7,710,865 B2 | 5/2010 | Naseh et al. |
| 7,747,772 B2 | 6/2010 | Raciborski et al. |
| 7,769,886 B2 | 8/2010 | Naseh et al. |
| 7,836,092 B2 | 11/2010 | Alaniz et al. |
| 7,839,870 B2 | 11/2010 | Siripunkaw et al. |
| 7,848,234 B2 | 12/2010 | McKinnon, III et al. |
| 7,881,225 B2 | 2/2011 | Siripunkaw et al. |
| 8,015,271 B2 | 9/2011 | McKeown et al. |
| 8,041,824 B1 | 10/2011 | Maeng |
| 8,042,132 B2 | 10/2011 | Carney et al. |
| 8,050,194 B2 | 11/2011 | Siripunkaw et al. |
| 8,108,911 B2 | 1/2012 | Datla et al. |
| 8,493,987 B2 | 7/2013 | Siripunkaw et al. |
| 8,914,522 B2 | 12/2014 | Rao et al. |
| 2001/0038690 A1 | 11/2001 | Palmer et al. |
| 2001/0049732 A1 | 12/2001 | Raciborski et al. |
| 2001/0051980 A1 | 12/2001 | Raciborski et al. |
| 2001/0053159 A1 | 12/2001 | Bunn et al. |
| 2002/0010865 A1 | 1/2002 | Fulton et al. |
| 2002/0012320 A1 | 1/2002 | Ogier et al. |
| 2002/0013948 A1 | 1/2002 | Aguayo et al. |
| 2002/0042819 A1 | 4/2002 | Reichert et al. |
| 2002/0061012 A1 | 5/2002 | Thi et al. |
| 2002/0066033 A1 | 5/2002 | Dobbins et al. |
| 2002/0103931 A1 | 8/2002 | Mott |
| 2002/0106017 A1 | 8/2002 | Dombkowski et al. |
| 2002/0116721 A1 | 8/2002 | Dobes et al. |
| 2002/0147819 A1 | 10/2002 | Miyakoshi et al. |
| 2002/0152384 A1 | 10/2002 | Shelest et al. |
| 2003/0014764 A1 | 1/2003 | Saladino et al. |
| 2003/0018805 A1 | 1/2003 | Meyerson |
| 2003/0067896 A1 | 4/2003 | Chuah et al. |
| 2003/0069965 A1 | 4/2003 | Ma et al. |
| 2003/0076848 A1 | 4/2003 | Bremler-Barr et al. |
| 2003/0106067 A1 | 6/2003 | Hoskins et al. |
| 2003/0135578 A1 | 7/2003 | Banga et al. |
| 2003/0145075 A1 | 7/2003 | Weaver et al. |
| 2003/0179742 A1 | 9/2003 | Ogier et al. |
| 2003/0200548 A1 | 10/2003 | Baran et al. |
| 2003/0236914 A1 | 12/2003 | Liu |
| 2004/0024912 A1 | 2/2004 | Fukao et al. |
| 2004/0037316 A1 | 2/2004 | Choi et al. |
| 2004/0048609 A1 | 3/2004 | Kosaka |

(56) References Cited

U.S. PATENT DOCUMENTS

| | | |
|---|---|---|
| 2004/0095923 A1 | 5/2004 | Ejzak et al. |
| 2004/0103308 A1 | 5/2004 | Paller |
| 2004/0153665 A1 | 8/2004 | Browne |
| 2004/0177133 A1 | 9/2004 | Harrison et al. |
| 2004/0179508 A1 | 9/2004 | Thubert et al. |
| 2004/0179539 A1 | 9/2004 | Takeda et al. |
| 2004/0190699 A1 | 9/2004 | Doherty et al. |
| 2004/0213278 A1 | 10/2004 | Pullen et al. |
| 2004/0214576 A1 | 10/2004 | Myers et al. |
| 2004/0226051 A1 | 11/2004 | Carney et al. |
| 2004/0242233 A1 | 12/2004 | Lutgen |
| 2005/0002388 A1 | 1/2005 | Gao |
| 2005/0005154 A1* | 1/2005 | Danforth ............... H04L 63/08 726/26 |
| 2005/0034115 A1 | 2/2005 | Carter et al. |
| 2005/0047442 A1 | 3/2005 | Volpe et al. |
| 2005/0055595 A1 | 3/2005 | Frazer et al. |
| 2005/0055708 A1 | 3/2005 | Gould et al. |
| 2005/0060749 A1 | 3/2005 | Hong et al. |
| 2005/0078668 A1 | 4/2005 | Wittenberg et al. |
| 2005/0078688 A1 | 4/2005 | Sharma et al. |
| 2005/0114518 A1 | 5/2005 | McMahon et al. |
| 2005/0122976 A1 | 6/2005 | Poli et al. |
| 2005/0123001 A1 | 6/2005 | Craven et al. |
| 2005/0204168 A1 | 9/2005 | Johnston et al. |
| 2005/0220126 A1 | 10/2005 | Gervais et al. |
| 2005/0232304 A1 | 10/2005 | Quigley |
| 2005/0233742 A1 | 10/2005 | Karaoguz et al. |
| 2005/0246757 A1 | 11/2005 | Relan et al. |
| 2006/0002294 A1 | 1/2006 | Chapman et al. |
| 2006/0031436 A1 | 2/2006 | Sakata et al. |
| 2006/0031921 A1 | 2/2006 | Danforth et al. |
| 2006/0059092 A1 | 3/2006 | Burshan et al. |
| 2006/0085833 A1 | 4/2006 | Kwon |
| 2006/0095951 A1 | 5/2006 | Kwon |
| 2006/0104232 A1 | 5/2006 | Gidwani |
| 2006/0123118 A1 | 6/2006 | Choe et al. |
| 2006/0159100 A1* | 7/2006 | Droms ............... H04L 12/2856 370/395.2 |
| 2006/0173977 A1 | 8/2006 | Ho et al. |
| 2006/0184640 A1 | 8/2006 | Hatch |
| 2006/0191005 A1 | 8/2006 | Muhamed et al. |
| 2006/0206586 A1 | 9/2006 | Ling et al. |
| 2006/0223497 A1 | 10/2006 | Gallagher et al. |
| 2006/0256799 A1 | 11/2006 | Eng |
| 2006/0271772 A1 | 11/2006 | Woundy et al. |
| 2006/0271946 A1 | 11/2006 | Woundy et al. |
| 2006/0285544 A1 | 12/2006 | Taylor et al. |
| 2006/0293962 A1 | 12/2006 | Malobrodsky et al. |
| 2007/0011725 A1 | 1/2007 | Sahay et al. |
| 2007/0016762 A1 | 1/2007 | Ho |
| 2007/0130471 A1 | 6/2007 | Walker Pina et al. |
| 2007/0133409 A1 | 6/2007 | McKinnon et al. |
| 2007/0174471 A1 | 7/2007 | Van Rossum |
| 2007/0177526 A1 | 8/2007 | Siripunkaw et al. |
| 2007/0180484 A1 | 8/2007 | Siripunkaw et al. |
| 2007/0183363 A1 | 8/2007 | Liden |
| 2007/0183405 A1 | 8/2007 | Bennett |
| 2007/0214265 A1 | 9/2007 | Zampiello et al. |
| 2008/0034071 A1 | 2/2008 | Wilkinson et al. |
| 2008/0060064 A1 | 3/2008 | Wynn et al. |
| 2008/0064349 A1 | 3/2008 | Flask et al. |
| 2008/0141369 A1 | 6/2008 | Butti et al. |
| 2008/0189778 A1 | 8/2008 | Rowley |
| 2008/0209537 A1 | 8/2008 | Wong et al. |
| 2008/0285544 A1 | 11/2008 | Qiu et al. |
| 2009/0005066 A1 | 1/2009 | Florkey et al. |
| 2009/0063833 A1 | 3/2009 | Ho |
| 2009/0125958 A1 | 5/2009 | Siripunkaw et al. |
| 2009/0238349 A1 | 9/2009 | Pezzutti |
| 2010/0064356 A1 | 3/2010 | Johnston et al. |
| 2010/0083362 A1 | 4/2010 | Francisco |
| 2010/0296441 A1 | 11/2010 | Barkan |
| 2011/0026536 A1 | 2/2011 | Siripunkaw et al. |
| 2013/0091534 A1 | 4/2013 | Gilde et al. |
| 2015/0012970 A1 | 1/2015 | Toksvig et al. |

OTHER PUBLICATIONS

EP Search Report 08 84 6111, dated Feb. 7, 2011.
ISR issued in PCT/US06/45184, mail date Oct. 29, 2007.
International Preliminary Report on Patentability issued in PCT/US06/45184, mail date May 27, 2008.
Canadian Office Action—Canadian Application 2568740—Dated Jan. 26, 2015.
Canadian Office Action—CA 2,568,741—Mailing Date: Feb. 18, 2015.
Canadian Office Action, dated Mar. 26, 2015—CA 2,700,625.
Response to Canadian Office Action—CA 2,568,740—Dated Jul. 13, 2015.
Response to Canadian Office Action—CA Appl. 2,568,741—submitted Aug. 18, 2015.
Canadian Office Action—CA Appl. 2,568,743—dated Apr. 2, 2015.
Response to Canadian Office Action—CA 2,700,625—Dated Sep. 14, 2015.
Response to Canadian Office Action—CA 2,568,743—Dated Oct. 1, 2015.
Canadian Office Action—CA Appl. 2,700,625—dated Feb. 26, 2016.
Canadian Office Action—CA 2,568,741—Mailed May 10, 2016.
Sep. 17, 2018—Canadian Office Action—CA 2,700,625.

* cited by examiner

INITIALIZING, PROVISIONING, AND MANAGING DEVICES

CROSS-REFERENCE TO RELATED APPLICATIONS

This application is a continuation of U.S. patent application Ser. No. 16/197,758, filed Nov. 21, 2018, which is a continuation of U.S. patent application Ser. No. 13/429,962, filed Mar. 26, 2012, now U.S. Pat. No. 10,171,293, which is a continuation of U.S. patent application Ser. No. 11/603,396 filed Nov. 22, 2006, now U.S. Pat. No. 8,149,847, which claims the benefit of U.S. Provisional Application No. 60/739,472 filed Nov. 23, 2005 and U.S. Provisional Application No. 60/791,803 filed Apr. 13, 2006. The entire disclosures of all priority applications are hereby incorporated by reference in their entireties.

BACKGROUND OF THE INVENTION

1. Field of the Invention

The invention relates to a method of initializing, provisioning, and managing a cable modem and a customer premise equipment device. The invention further relates to a subscriber gateway device for connecting to a provider network.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. In certain applications, it is desirable for both the cable modem and the set-top box to each have a network address. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application where the provider network is an Internet protocol (IP) network utilizing IPv4 addressing, the cable modem can obtain an IP address in a known manner, and customer premise equipment connected to the HFC network through the cable modem may obtain an IP address, for example, by utilizing DHCP.

Although the traditional IPv4 networks have been used for many applications that have been successful, this addressing approach has certain limitations, for example, the number of addresses available. There is a desire to utilize a more advanced addressing technique such as, for example, IPv6.

DOCSIS 3.0 does provide a way to initialize, provision, and manage a cable modem connected to an IPv4 or an IPv6 provider network. During initialization, the CMTS initializes the cable modem such that the cable modem obtains an appropriate IP address. However, in this approach, a customer premise equipment device such as a set-top box connected to the cable modem that needs to dynamically obtain an address is not made aware of the address type of the provider network. In order for the set-top box to obtain a network address, the set-top box could sequentially make requests for different types of addresses until eventually an address of the correct type is requested and obtained. For example, a set-top box could request an IPv4 address, and if there is no response, request an IPv6 address. Unfortunately, in a large network, these transactions create significant excessive and unwanted network traffic.

For the foregoing reasons, there is a need for a method of initializing, provisioning, and managing a cable modem and a customer premise equipment device in which the customer premise equipment device is informed as to the proper network address type of the network so as to avoid unnecessary transactions which become very significant in a large network implementation.

SUMMARY OF THE INVENTION

In accordance with the invention, a method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In accordance with the invention, the method further comprises passing a message from the cable modem to the customer premise equipment device indicative of the network address type. According to the invention, the configuration file, in addition to containing service provisioning information, further includes information indicative of a network address type for the customer premise equipment device. This further information may be included in a number of custom fields in the configuration file. Adding these custom fields to the configuration file as contemplated by the invention allows the configuration file to indicate the network address type for the customer premise equipment device. The customer premise equipment device receives the message passed from the cable modem, and is provided with a network address in accordance with the network address type indicated in the message.

According to the invention, the customer premise equipment device, in turn, does not create excessive network transactions in attempting to obtain its network address. This is achieved by including custom information in the configuration file sent to the cable modem from the network server. This configuration file typically includes various service provisioning information, and in accordance with the invention, additionally includes network address type information for the customer premise equipment device.

At the more detailed level, the invention comprehends additional features. In one aspect, the customer premise equipment device is a network addressable set-top box. The method further comprises requesting a network address for the set-top box in accordance with the network address type indicated in the message. The set-top box and the cable modem may be both embedded in a subscriber gateway.

The provider network connected to the CMTS may be an Internet protocol (IP) network. In this way, the network address type indicated in the configuration file is a type of IP address. For example, the network address type may be indicated as either IPv4 or IPv6. In this way, the embedded set-top box in the subscriber gateway (or other CPE device) knows whether to attempt to obtain an IPv4 address or an IPv6 address, avoiding unnecessary network transactions in order to obtain a network address.

In one aspect of the invention, the provider network includes a dynamic host configuration protocol (DHCP) server. The customer premise equipment device requests a network address in accordance with the network address type indicated in the message by sending a request to the DHCP server.

In preferred embodiments of the invention, the cable modem has a hardware address, for example, a media access control (MAC) address. The network address type for the CPE device indicated by information in the configuration file sent from the network server is based at least in part on the hardware address of the cable modem. That is, configuration files may be customized on a per-modem basis. For example, some set-top boxes may be using IPv4 while others are using IPv6. The provider is able to select a network address type for each customer premise equipment device. This allows a granular approach to implementing the network addressing scheme, and avoids the need to use a single type of addressing for the entire network.

DETAILED DESCRIPTION OF THE PREFERRED EMBODIMENT

Figure 1:
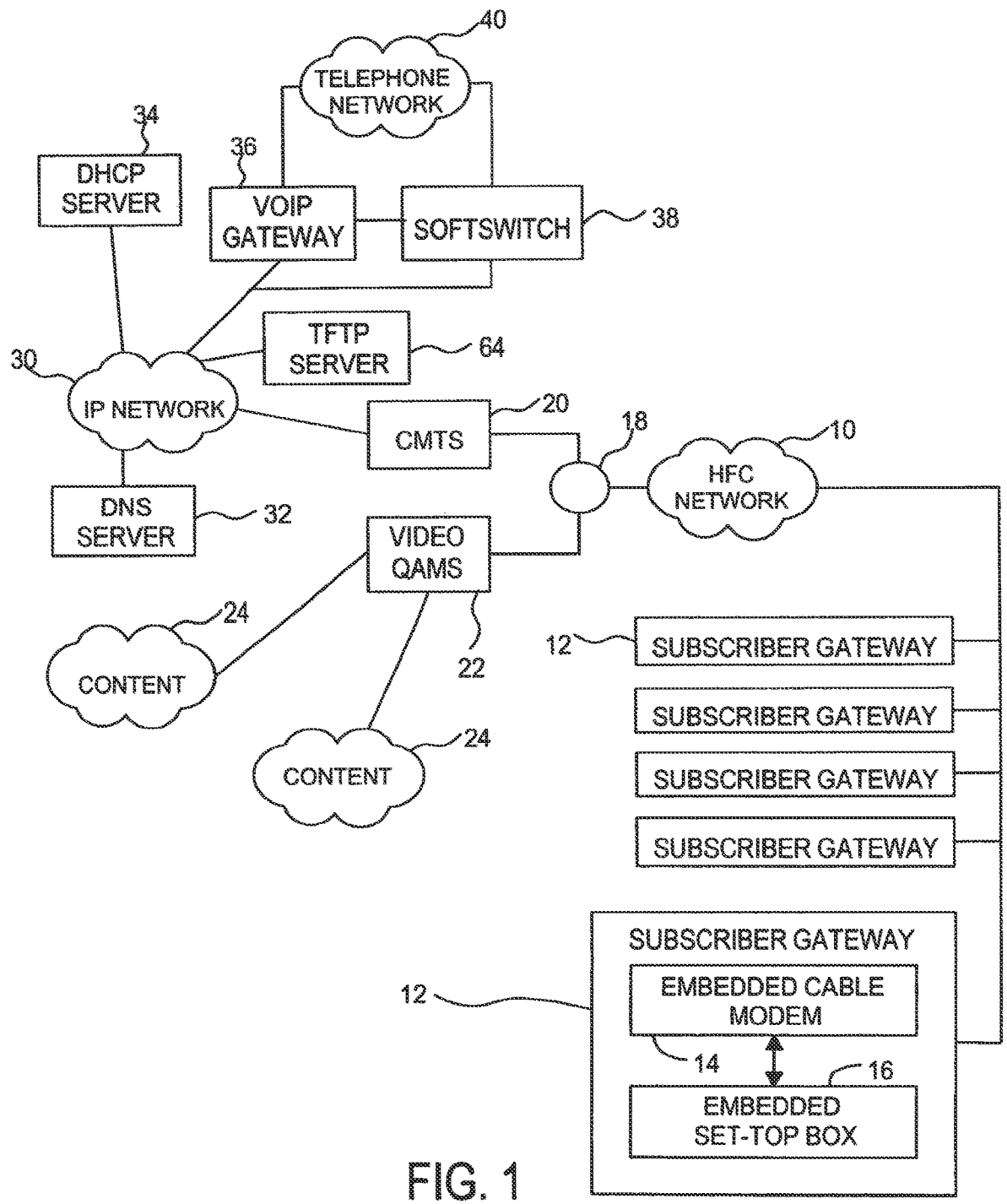
FIG. 1 illustrates a network diagram in accordance with a preferred embodiment of the invention.

In FIG. 1, the hybrid fiber coax (HFC) network 10 provides service to a plurality of subscribers. Each subscriber has a subscriber gateway 12. The subscriber gateway 12 is in the form of a next-generation set-top box and includes an embedded cable modem 14 and an embedded set-top box 16. The head end equipment includes cable modem termination system (CMTS) 20 and a plurality of video quadrature amplitude modulation (QAM) systems 22. Connector 18 illustrates the distribution of content from video QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. Further illustrated in FIG. 1, CMTS 20 connects to the provider IP network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also, illustrated is trivial file transfer protocol (TFTP) server 64 which serves the configuration files.

Figure 2:
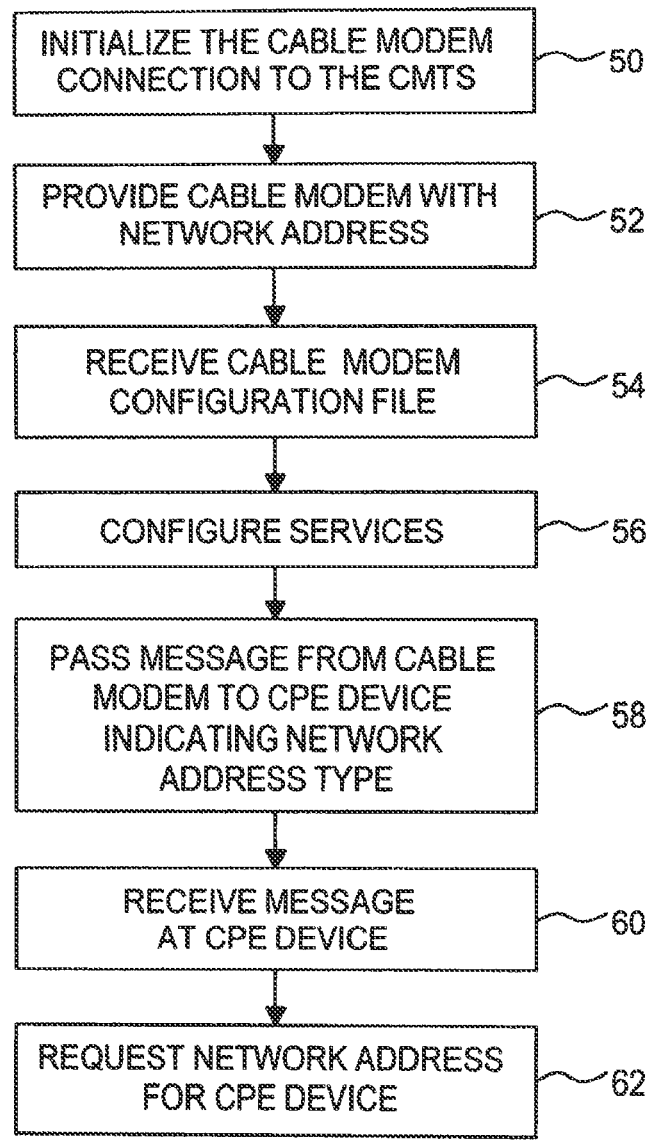
FIG. 2 illustrates initializing, provisioning, and managing a cable modem and a customer premise equipment device in the preferred embodiment of the invention.

With reference to FIGS. 1 and 2, a preferred embodiment of initializing, provisioning, and managing a cable modem and a customer premise equipment device is illustrated. The customer premise equipment device is depicted as an embedded set-top box 16, but may take other forms.

At block 50, the cable modem connection to the CMTS 20 is initialized. At block 52, the cable modem 14 is provided with a network address. In more detail, the cable modem is initialized and provisioned using a suitable technique such as known DOCSIS techniques. At block 54, the cable modem 14 receives the cable modem configuration file, for example, from trivial file transfer protocol (TFTP) server 64. At block 56, services are configured. At this point, the cable modem 14 has completed initialization, and is a manageable network element in the operator's IP network.

Generally, the initializing and provisioning may take place according to DOCSIS standards or any other suitable approach involving a downloaded configuration file; however, in accordance with the invention, the configuration file sent to the cable modem includes service provisioning information and further includes information indicative of a network address type for the embedded set-top box 16 (or other CPE device). The inclusion of this network address type information in the configuration file is a customization to the configuration file in accordance with the invention that has many advantages. This customization may take place by, for example, adding custom fields to the configuration file. According to the invention, cable modem 14 passes a message to the set-top box 16 indicating the network address type. The message passing is indicated at block 58 in FIG. 2. The message passing may take any appropriate form. For example, a direct, dedicated connection between embedded cable modem 14 and embedded set-top box 16 may be used for the message passing. Depending on the application, other approaches may be appropriate, for example, when the CPE device is something other than an embedded set-top box.

At block 60, the message is received, and at block 62, the network address is requested in accordance with the network address type indicated in the message.

It is appreciated that the invention, by customizing the configuration file, provides a way for the embedded set-top box or other CPE device behind the cable modem to make an appropriate request for a network address from the provider network 30. By informing the embedded set-top box 16 of the appropriate network address type, excessive and unnecessary transactions may be avoided. The significance of avoiding these unnecessary transactions increases in a larger network. For example, IP network 30 may be an IPv4, IPv6, or mixed IPv4 and IPv6 network. Suitable techniques for initializing and provisioning the cable modem are used to give the cable modem an appropriate network address. However, in order for the set-top box or other CPE device to be aware of the type of address to request, the cable modem must pass a message to the CPE device as described above.

In a preferred embodiment of the invention, the provider network may take a granular approach to migrating CPE devices between network address types. For example, the network may simultaneously support IPv4 and IPv6 addressing. In this example, for each cable modem/CPE device pair, the network address type for the CPE device is related to the hardware address of the cable modem by the provider. Accordingly, the configuration file sent to a particular cable modem indicates the appropriate network address type for the CPE device paired with the particular cable modem.

It is appreciated that embodiments of the invention may involve any suitable underlying initializing and provisioning technique with a customized configuration file. Further, the cable modem and CMTS may take a variety of forms and the type of cable plant is not limited to coax cable or HFC arrangements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   sending, by a server and to a gateway, a configuration file specifying a network address type corresponding to a first protocol of a plurality of protocols, wherein the configuration file is configured to cause the gateway to send, to customer premises equipment connected via a network to the gateway, a message specifying the network address type; and
   receiving, by the server and from the customer premises equipment, a request for a network address of the specified network address type.

2. The method of claim 1, wherein the configuration file comprises one or more fields indicating that the network address type corresponding to the first protocol should be used for the customer premises equipment.

3. The method of claim 1, further comprising:
   determining, based on a hardware address of the gateway, the network address type corresponding to the first protocol.

4. The method of claim 3, wherein the hardware address is a media access control address.

5. The method of claim 1, wherein the first protocol is one of Internet Protocol version 4 or Internet Protocol version 6.

6. The method of claim 1, wherein the configuration file comprises information for provisioning services via the gateway.

7. The method of claim 1, further comprising, prior to the sending, provisioning, by the server, the gateway with a network address of the network address type.

8. The method of claim 1, wherein the configuration file indicates:
   a first network address type associated with a first hardware address, and
   a second network address type associated with a second hardware address.

9. A method comprising:
   receiving, from a network server, a gateway configuration file specifying a network address type corresponding to a first protocol of a plurality of protocols;
   processing, by a first device, the gateway configuration file; and
   sending, from the first device and to a second device, a message instructing the second device to use the network address type corresponding to the first protocol when requesting, from the network server, a network address for the second device.

10. The method of claim 9, wherein the network address type corresponding to the first protocol is based at least in part on a hardware address of the first device.

11. The method of claim 10, wherein the hardware address is a media access control address.

12. The method of claim 9, wherein the first protocol is a version of Internet Protocol ("IP").

13. The method of claim 12, wherein the version of IP is one of version 4 and version 6.

14. The method of claim 9, comprising:
   establishing, by the first device, a connection, wherein the first device receives a communication from the second device and forwards the communication via the connection.

15. The method of claim 9, wherein the gateway configuration file comprises service-provisioning information.

16. A method comprising:
   initializing a connection between a gateway and a modem termination system;
   receiving, by the gateway, a configuration file from a network server, wherein the configuration file contains service provisioning information and information indicative of a network address type for a customer premise equipment device; and
   sending a message from the gateway to the customer premise equipment device indicative of the network address type informing the customer premise equipment device which one of a plurality of protocol versions to use when requesting a network address.

17. The method of claim 16, wherein the network address type indicated in the configuration file is a type of Internet Protocol ("IP") address, the method further comprising:
   determining an IP address type from the network address type.

18. The method of claim 17, wherein the determining comprises: including an instruction in the message instructing the customer premise equipment device to use either an IP version 4 address type or an IP version 6 type when requesting the network address.

19. The method of claim 16, wherein the gateway has a hardware address, and wherein the network address type indicated by information in the configuration file is based at least in part on the hardware address of the gateway.

20. The method of claim 19, further comprising:
   establishing a plurality of network address types;
   for a plurality of gateway and customer premise equipment device pairs, selecting a network address type for each customer premise equipment device; and
   relating the network address type for each customer premise equipment device to the hardware address of the gateway in the respective pair.

* * * * *